(12) United States Patent
Iijima et al.

(10) Patent No.: US 7,273,252 B2
(45) Date of Patent: Sep. 25, 2007

(54) VEHICLE SEAT

(75) Inventors: Hiroshi Iijima, Shioya-gun (JP); Yoshiyuki Matsumoto, Wako (JP)

(73) Assignees: TS Tech Co., Ltd., Asaka (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/418,214

(22) Filed: May 5, 2006

(65) Prior Publication Data

US 2006/0255635 A1 Nov. 16, 2006

(30) Foreign Application Priority Data

May 11, 2005 (JP) ............................. 2005-138395

(51) Int. Cl.
*A47C 3/00* (2006.01)
*A47C 7/02* (2006.01)

(52) U.S. Cl. .................. 297/284.3; 297/284.1

(58) Field of Classification Search ............ 297/284.3, 297/314, 344.21, 284.1
See application file for complete search history.

(56) References Cited

U.S. PATENT DOCUMENTS

| 5,228,747 | A  | * | 7/1993 | Greene | ..................... 297/284.3 |
| 6,609,754 | B2 | * | 8/2003 | Rajasingham | ............ 297/284.3 |
| 6,910,736 | B2 | * | 6/2005 | White | .................. 297/284.3 X |

FOREIGN PATENT DOCUMENTS

JP    U 64-002632    1/1989

* cited by examiner

*Primary Examiner*—Anthony D. Barfield
(74) *Attorney, Agent, or Firm*—Oliff & Berridge, PLC

(57) ABSTRACT

A vehicle seat includes a base frame supported on a base, a seat cushion provided on the base frame, and a seat back, wherein the seat back is structured so that a plurality of seat back pieces are arranged in the up-and-down direction with a predetermined space; and the base frame or a lowermost seat back piece is attached with an attachment member that stands so as to be elastically deformed and be able to be twisted around an axis, and the plurality of seat back pieces are attached to the attachment member, respectively.

7 Claims, 8 Drawing Sheets

VEHICLE SEAT

BACKGROUND OF THE INVENTION

1. Field of the Invention

The present invention relates to a vehicle seat by which a user can twist his or her body toward the backside and which is comfortable to sit in.

2. Related Art

Conventionally, vehicle seats have been subjected to various technical developments. One of such techniques provides, for example, a known automobile seat structured so that a backrest is divided to an upper half backrest and a lower half backrest and the upper half backrest is attached to the lower half backrest so that the former can be rotated to the latter around a vertical axis line via a pivot point (see Patent Publication 1).

The automobile seat as described above also allows, when the driver checks the backside or takes a baggage or the like on a backseat, a driver to twist his or her upper body toward the backside in accordance with the rotation of the upper half backrest.

[Patent Publication 1] Japanese Utility Model Unexamined Publication No. 64-002632

By the way, the automobile seat is designed so that a regular position-lock device is provided at a side face of the lower half backrest. This regular position-lock device can be unlocked by a one-touch operation by depressing a lever. By unlocking the regular position-lock device, the upper half backrest can be rotated in the left-and-right direction.

However, this regular position-lock device must be unlocked by manually depressing the lever. Furthermore, this regular position-lock device requires a user to extend his or her arm to the lever at the side face of the lower half backrest, which may cause a situation where the user requires a long time to unlock the device particularly for an operation for moving the vehicle backward.

On the other hand, although the above-described structure of the automobile seat allows the upper half backrest to be rotated to the lower half backrest, this structure does not have a rotation restoration force. Thus, when the upper half backrest is returned to the regular position, this structure has required the driver to return his or her upper body to the original position by rotating his or her body in the reverse direction.

Furthermore, this structure allows only the upper half backrest to be rotated in the left-and-right direction as described above. This has caused an inconvenience where, when the driver twists the upper body, the upper half backrest cannot be rotated in a manner adapted to the contour of the driver, thus failing to provide a fit with the back face of the driver.

Due the situation as described above, such a vehicle seat has been desired that is different from the conventional one in that a driver can twist his or her body toward the backside without requiring a lock mechanism such as the regular position-lock device; in that the vehicle seat can be fit with the back face of the driver; in that the vehicle seat has a rotation restoration force; and in that the vehicle seat is comfortable to sit in.

SUMMARY OF THE INVENTION

It is an objective of the present invention to provide a vehicle seat by which a driver can easily twist his or her body toward the backside and which is comfortable to sit in.

In order to solve the problems as described above, in accordance with the first aspect of the invention, A vehicle seat comprising a base frame supported on a base, a seat cushion provided on the base frame, and a seat back, wherein:

the seat back is structured so that a plurality of seat back pieces are arranged in the up-and-down direction with a predetermined space; and the base frame or a lowermost seat back piece is attached with an attachment member that stands so as to be able to be elastically deformed and be twisted around an axis, and the plurality of seat back pieces are attached to the attachment member, respectively.

According to the invention, the base frame or a lowermost seat back piece is attached with an attachment member that stands so as to be elastically deformed and be able to be twisted around an axis, and the attachment member is attached with the plurality of seat back pieces in the vertical direction with a predetermined space. Thus, when a driver twists his or her body toward the backside, the plurality of seat back pieces can be twisted around an axis in accordance with the twist of the body of the driver, thus allowing the driver to twist his or her body toward the backside. Furthermore, when the driver twists his or her body toward the backside, the respective plurality of seat back pieces are rotated in a manner adapted to the contour of the driver. This can provide a fit with the back surface of the driver and a reaction force by the twist of the attachment member can provide the rotation restoration force of the plurality of seat back pieces. Thus, when the driver returns the backwardly-twisted body to the front side, the driver can return the body easily, providing a comfortable seat to sit in.

Preferably, the attachment member is a torsion bar.

According to the invention, the plurality of seat back pieces attached to the torsion bar can be rotated in accordance with the deformation of the twisted torsion bar. Furthermore, the rotation restoration force of the plurality of seat back pieces can be obtained in accordance with the reaction force of the twisted torsion bar. Thus, the driver can twist his or her body without requiring the conventional lock mechanism for restricting the rotation of the plurality of seat back pieces.

Preferably, center parts in the width direction of the plurality of seat back pieces are attached to the attachment member, respectively.

According to the invention, the center parts in the width direction of the plurality of seat back pieces are attached to the attachment member, respectively. Thus, the plurality of seat back pieces can be easily rotated in any of right or left directions in a manner adapted to the contour of the driver. This can provide a fit between the plurality of seat back pieces and the back surface of the driver.

Preferably, a sleeve member is externally inserted into the attachment member and a lower end section of the sleeve member is fixed to the base frame or the lowermost seat back piece.

According to invention, the sleeve member is externally inserted into the attachment member and the lower end section of this sleeve member is fixed to the base frame or the lowermost seat back piece. Thus, the sleeve member can reinforce the attachment member. This can prevent, when the driver twists his or her body toward the backside with a large angle, the seat back from being twisted in an unstable manner.

Preferably, the seat back pieces are linked to the attachment member by linking members; and the sleeve member includes opening sections to which the linking members are inserted and which restrict twist of the seat back piece by an abutment of end sections of the opening sections with the linking members when the seat back piece and the attachment member are twisted around an axis by a predetermined amount.

According to the invention, the sleeve member includes opening sections to which the linking members are inserted and which restrict the twist of the seat back piece by an abutment of the opening sections with the linking members when the seat back piece and the attachment member are twisted around an axis by a predetermined amount. By this structure, the seat back pieces can be retained at an appropriate twist angle so as to be prevented from being twisted excessively. Thus, when the driver twists his or her body toward the backside with a large angle, the body of the driver can be supported in a stable manner.

Preferably, the sleeve member is attached with a pair of long backing plates in an axial direction of the sleeve member so that the backing plates protrude to an outer side in a diameter direction of the sleeve member; and a back face of the seat back piece is attached with restriction members that restrict, when this seat back piece and the attachment member are twisted around an axis with a predetermined amount, the twist of the seat back piece by abutting with the backing plate, the restriction members are arranged to have a predetermined space to the backing plate.

According to the invention, a back face of the seat back piece is attached with restriction members that are arranged to have a predetermined space to the backing plate. Thus, when the seat back piece and the attachment member are twisted around an axis with a predetermined amount, the restriction member is abutted with the backing plate to restrict the twist angle of the seat back piece. By this structure, the seat back pieces can be retained at an appropriate twist angle so as to be prevented from being twisted excessively. Thus, when the driver twists his or her body toward the backside with a large angle, the body of the driver can be supported in a stable manner.

Preferably, a distance between the backing plate and the restriction members increases toward a top seat back piece.

According to the invention, a distance between the backing plate and the restriction members increases toward a top seat back piece. Thus, the twist angle increases toward the upper seat back piece, thus allowing the driver to twist his or her body toward the backside in an easy manner.

Preferably, an upper end section of the attachment member is attached with a headrest.

According to the invention, an upper end section of the attachment member is attached with a headrest. Thus, the headrest is twisted around an axis in accordance with the twist of the body of the driver toward the backside. Thus, the driver can easily twist his or her body toward the backside with a large angle.

According to the present invention, the plurality of seat back pieces and the headrest are twisted around an axis in accordance with the twist of the body of the driver toward the backside. Thus, the driver can easily twist his or her body toward the backside with a large angle. Furthermore, when the driver twists his or her body toward the backside, the respective plurality of seat back pieces are rotated in a manner adapted to the contour of the driver. This can provide a fit with the back surface of the driver and a reaction force by the twist of the attachment member can provide the rotation restoration force of the plurality of seat back pieces. Thus, when the driver returns the backwardly-twisted body to the front side, the driver can return the body easily, providing a comfortable seat to sit in.

DETAILED DESCRIPTION OF PREFERRED EMBODIMENTS

Hereinafter, a vehicle seat 10 according to the present invention will be described with reference to the drawings.

Figure 1:
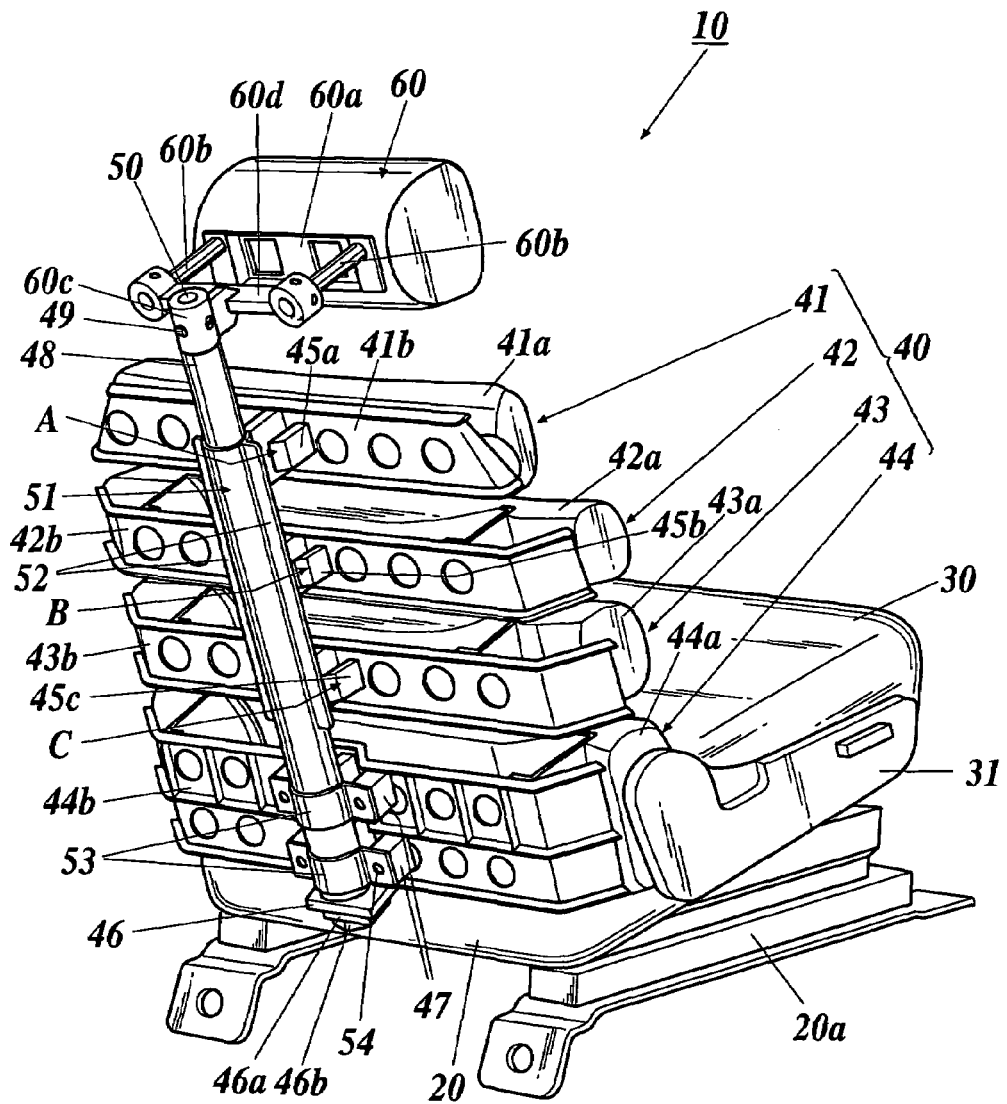
FIG. 1 is a perspective view illustrating an outer shape of a vehicle seat.
Figure 1:
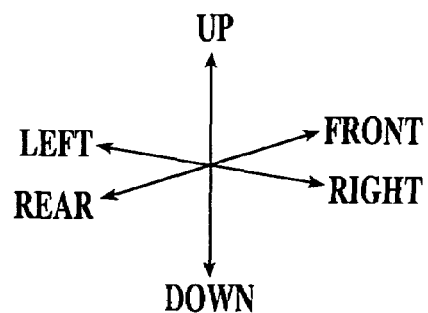

As shown in FIG. 1, the vehicle seat 10 of this embodiment includes a base frame 20 supported by a base 20a; a seat cushion 30 provided on the base frame 20; and a seat back 40. The seat back 40 is structured so that a plurality of seat back pieces 41, 42, 43, and 44 are arranged in the vertical direction with a predetermined space thereamong. At the seat back piece 44 positioned at the lowermost position, an attachment member 50 stands that can be twisted while elastically deforming around the axis. The center parts in the width direction of the plurality of seat back pieces 41, 42, 43, and 44 are attached to the attachment member 50, respectively.

A headrest 60 is attached to an upper end section 50a of the attachment member 50.

Figure 2:
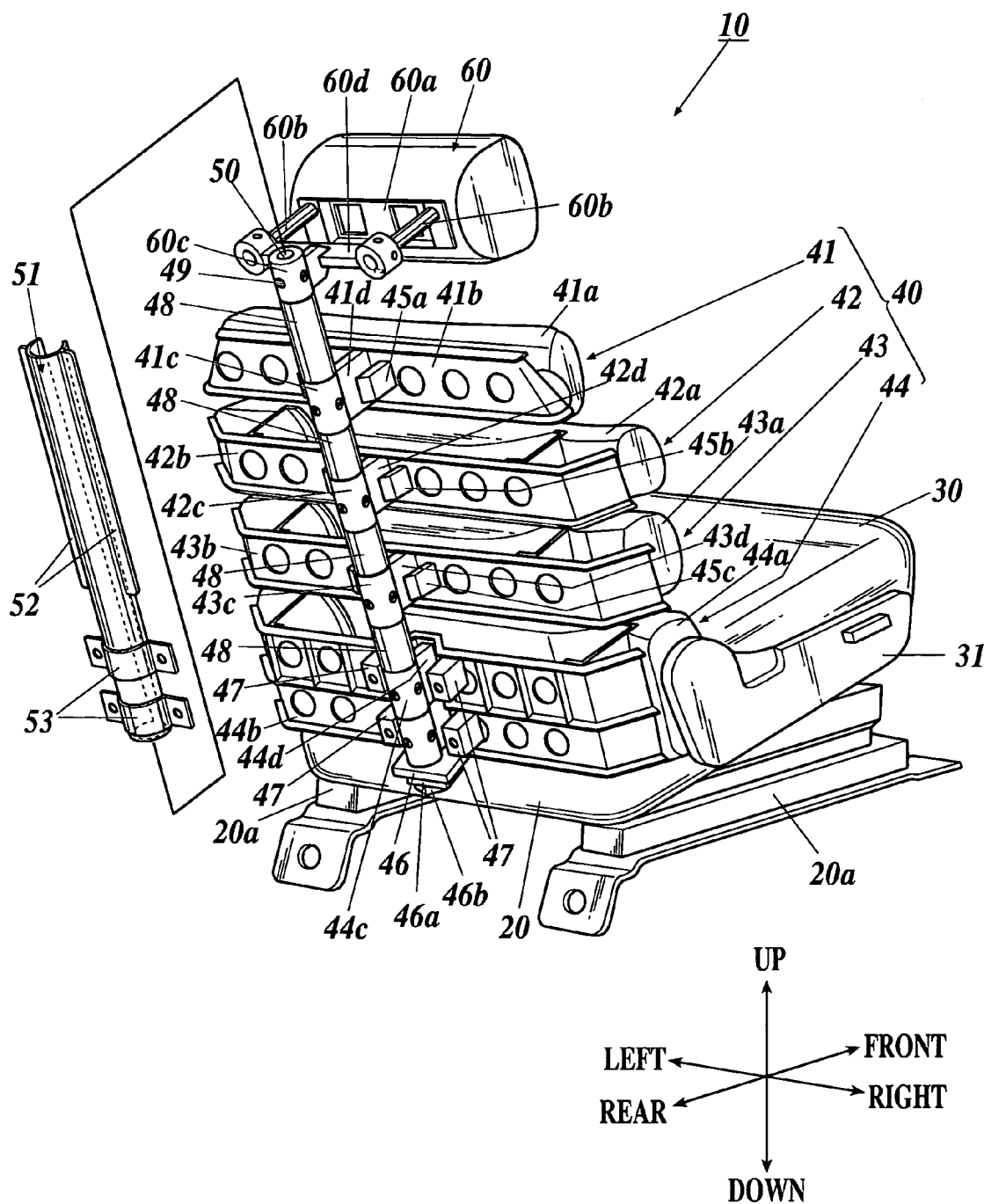
FIG. 2 is a perspective view before a sleeve member is externally inserted.

For convenience of description, the plurality of seat back pieces 41, 42, 43, and 44 will be denoted, as shown in FIG. 1 or FIG. 2, as the first seat back piece 41, the second seat back piece 42, the third seat back piece 43, and the fourth seat back piece 44 from the upper side.

The respective seat back pieces 41, 42, 43, and 44 comprise pads 41a, 42a, 43a, and 44a having a contact with the back face of a driver; plates 41b, 42b, 43b, and 44b to which the pads 41a, 42a, 43a, and 44a are attached; seat shafts 41c, 42c, 43c, and 44c that are attached to the center parts in the width direction of the plates 41b, 42b, 43b, and 44b and that are attached to the attachment member 50; and restriction members 45a, 45b, and 45c (which will be described later). In this structure, the fourth seat back piece 44 functions as the seat back piece 44 positioned at the lowermost position and thus does not include the restriction member 45. Thus, the fourth seat back piece 44 includes a fixation section 46 for fixing an attachment member 50 (which will be described later) and a sleeve fixation member 47 for fixing a sleeve member 51.

The attachment member 50 is a torsion bar in which a lower end section 50b includes a screw section 50c. The screw section 50c is attached to a fixation section 46 provided at the fourth seat back piece 44 and is firmly connected by a washer 46a and a nut 46b.

The term "torsion bar" herein means a type of spring that uses the bar shape as described above and that uses a principle of torsion. The torsion bar uses a reaction force to torsion and is used, for example, in a suspension device or a stabilizer or the like for an automobile or a railway vehicle or the like.

Although the above embodiment provided the attachment member 50 so that the attachment member 50 stands at the fourth seat back piece 41 as described above, the present invention is not limited to this. The same effect also can be obtained by, for example, providing the fixation section 46 at the base frame 20 so that the fixation section 46 is attached with the attachment member 50.

Furthermore, although this embodiment provided the attachment member 50 as a torsion bar, the present invention is not limited to this. The attachment member 50 also may be, for example, a coil spring or the like that can stably support a driver and that can be twisted around the axis while elastically deforming and can be appropriately changed within a scope not deviating from the gist of the present invention.

The headrest 60 functions to support the head of a driver. At the back face of the headrest 60, a plate 60a is provided. The headrest 60 is structured to include: stay members 60b that extend from the plate 60a toward the backside; and a headrest shaft 60c to which the stay members 60b are attached and which is attached to the attachment member 50.

At both sides in the width direction of the base frame 20 and the seat cushion 30, side frames 31 are provided that connect the base frame 20 and the seat cushion 30 to the seat back 40.

As shown in FIG. 2, the attachment member 50 is attached with the center parts in the width direction of the plurality of seat back pieces 41, 42, 43, and 44, respectively. Then, the sleeve member 51 is externally inserted into the center parts on the attachment member 50. The lower end section 50b of the sleeve member 51 is fixed to the fourth seat back piece 44.

This sleeve member 51 is attached with a pair of long backing plates 52 in the axial direction so that the backing plates 52 protrude to the outer side in the diameter direction of the sleeve member 51. At the lower end section of the sleeve member 51, a fixation plate section 53 is provided for fixing the sleeve member 51 to the fourth seat back piece 44.

Although this embodiment has fixed the sleeve member 51 to the fourth seat back piece 44, the present invention is not limited to this. For example, the same effect also can be obtained by providing a predetermined fixation section 46 to the base frame 20 so that the fixation section 46 is attached with the sleeve member 51.

In the above structure of this embodiment, restriction members 45a, 45b, and 45c are provided, as shown in FIG. 1 or FIG. 2, at the back sides of the plurality of seat back pieces 41, 42, and 43 with a predetermined space thereamong. The restriction members 45a, 45b, and 45c function, when the seat back pieces 41, 42, and 43 and the attachment member 50 are twisted around the axis with a predetermined amount, to be abutted with the backing plates 52 so that the twist of the seat back pieces 41, 42, and 43 can be restricted.

Figure 3A:
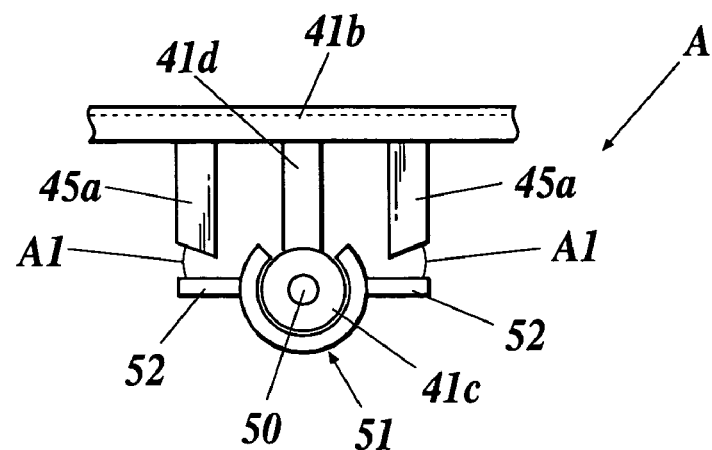
FIG. 3A is a cross-sectional view illustrating the distances between backing plates and restriction members shown in FIG. 1 at the reference numeral A as well as the twist angles.
Figure 3B:
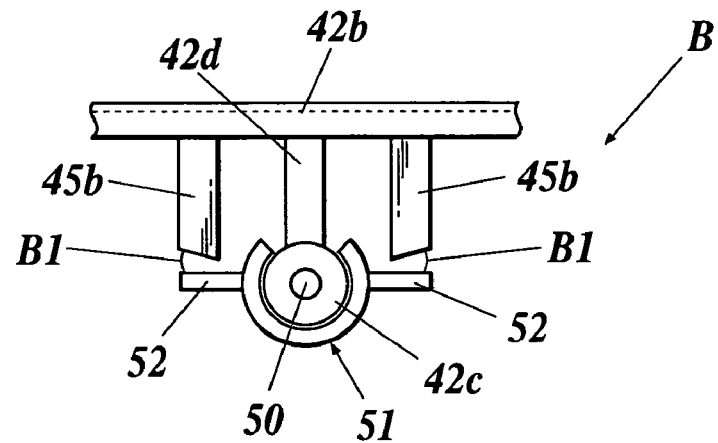
FIG. 3B is a cross-sectional view illustrating the distances between the backing plates and the restriction members shown in FIG. 1 at the reference numeral B as well as the twist angles.
Figure 3C:
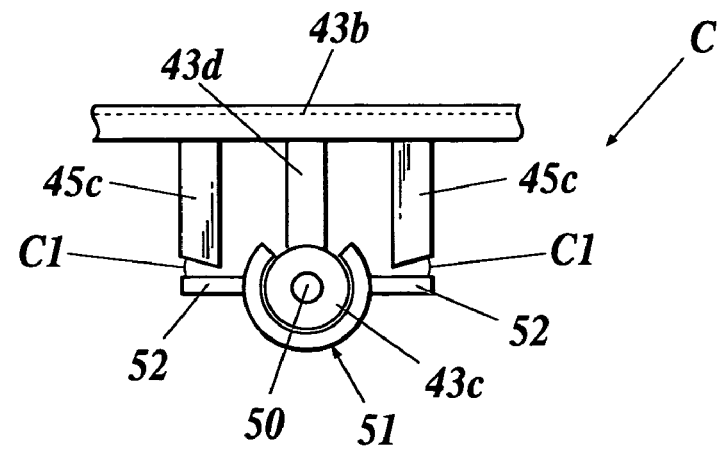
FIG. 3C is a cross-sectional view illustrating the distances between the backing plates and the restriction members shown in FIG. 1 at the reference numeral C as well as the twist angles.

FIGS. 3A to 3C are a cross-sectional view illustrating the distances and twisting angles between the backing plates 52 and the restriction members 45a, 45b, and 45c at the reference numerals A, B, and C of FIG. 1. Specifically, the backing plates 52 and the restriction members 45a, 45b, and 45c are arranged so as to be abutted to one another when the plurality of seat back pieces 41, 42, and 43 are twisted. Furthermore, as shown in FIG. 4, the distance between the backing plates 52 and the restriction members 45a, 45b, and 45c increases toward the top seat back piece 41 so that the twist angles of the seat back pieces 41, 42, 43, and 44 increase toward the seat back piece 41 in order to allow a driver to easily twist his or her body toward the backside.

Figure 4:
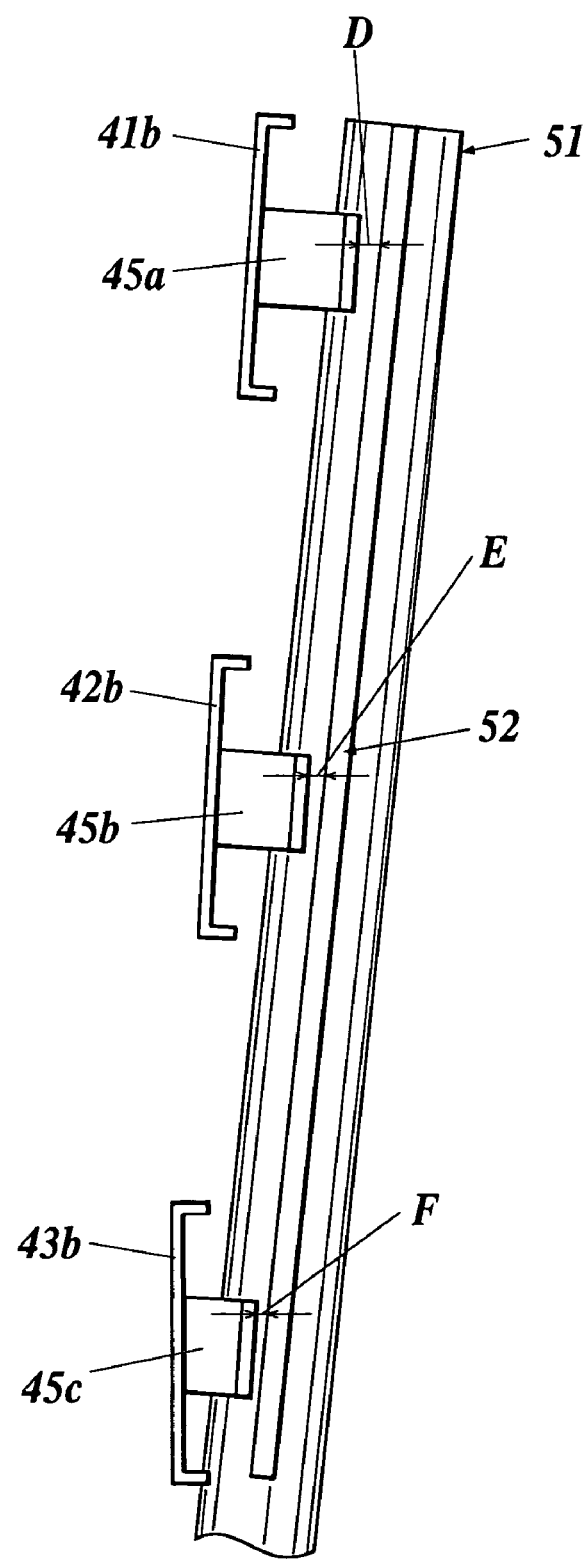
FIG. 4 is a side view illustrating the distances between the backing plates and the restriction members.

Specifically, the respective distances D, E, and F in FIG. 4 are set so that a relation of "distance D>distance E>distance F" is established.

The restriction members 45a, 45b, and 45c are also designed to be abutted with the backing plates 52 when the plurality of seat back pieces 41, 42, and 43 are twisted. Thus, the restriction members 45a, 45b, and 45c are shaped, as shown in FIGS. 3A to 3C, so that faces to be abutted with the backing plates 52 are expanded with a predetermined angle toward the outer side when seen in a cross section. In this design, the restriction members 45a, 45b, and 45c are shaped so that the expansion amounts increase toward the restriction member 45a provided at the upper seat back piece 41.

Specifically, the respective twist angles of reference numerals A, B, and C in FIGS. 3A to 3C are set so that a relation of "angle A1>angle B1>angle C1" can be established.

Figure 5A:
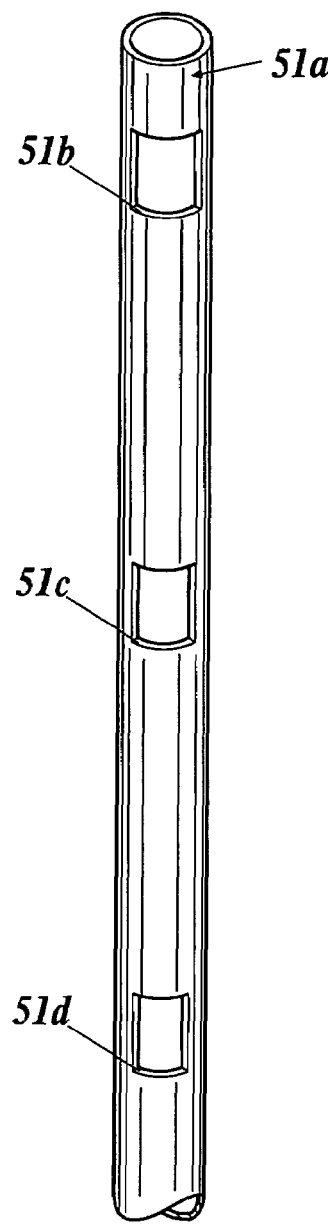
FIG. 5A is a perspective view illustrating another example of the sleeve member.
Figure 5B:
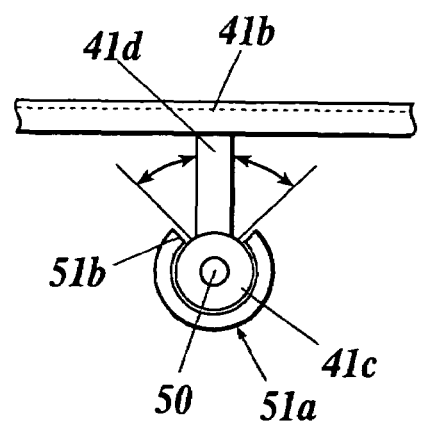
FIG. 5B is a cross-sectional view illustrating a twist angle of an opening end section and a linking member.

On the other hand, the use of a sleeve member 51a having a different shape as that of the above-described sleeve member 51 as shown in FIGS. 5A and 5B also can restrict the twist angles of the plurality of seat back pieces 41, 42, 43, and 44 as in the above-described sleeve member 51.

Specifically, the cylindrical-shaped sleeve member 51a as shown in FIG. 5A includes a plurality of opening sections 51b, 51c, and 51d. In this structure, the plurality of opening sections 51b, 51c, and 51d are inserted with linking members 41d, 42d, 43d, and 44d that provide a linkage between the seat back pieces 41, 42, 43, and 44 and the attachment member 50 and the sleeve member 51a is externally inserted into the seat shafts 41c, 42c, 43c, and 44c.

As a result, when the seat back pieces 41, 42, 43, and 44 and the attachment member 50 are twisted around the axis with a predetermined amount as shown in FIG. 5B, the linking members 41d, 42d, 43d, and 44d can be abutted with end sections of the opening sections 51b, 51c, and 51d to restrict the twist angles of the seat back pieces 41, 42, 43, and 44. Thus, the seat back pieces 41, 42, 43, and 44 can be retained at an appropriate twist angle in a manner in which the seat back pieces 41, 42, 43, and 44 are prevented from being excessively twisted. Thus, when a driver twists his or her body toward the backside with a large angle, the driver can be supported in a stable manner.

Furthermore, by increasing the opening widths of the opening sections 51b, 51c, and 51d toward the upper opening section, the twist angles of the seat back pieces 41, 42, 43, and 44 are increased toward the upper seat back piece, thus allowing a driver to easily twist his or her body toward the backside with a large angle.

When the linking members 41d, 42d, 43d, and 44d are inserted to the opening sections 51b, 51c, and 51d so that the sleeve member 51a is externally inserted into the seat shafts 41c, 42c, 43c, and 44c as described above in the manufacture, it is preferable that the sleeve member 51a is previously externally inserted into the seat shafts 41c, 42c, 43c, and 44c in the manufacture stage because the cylindrical-shaped sleeve member 51a includes the plurality of opening sections 51b, 51c, and 51d as shown in FIG. 5A.

Next, a method for attaching the seat back 40 and the headrest 60 to the attachment member 50 will be described.

Figure 6:
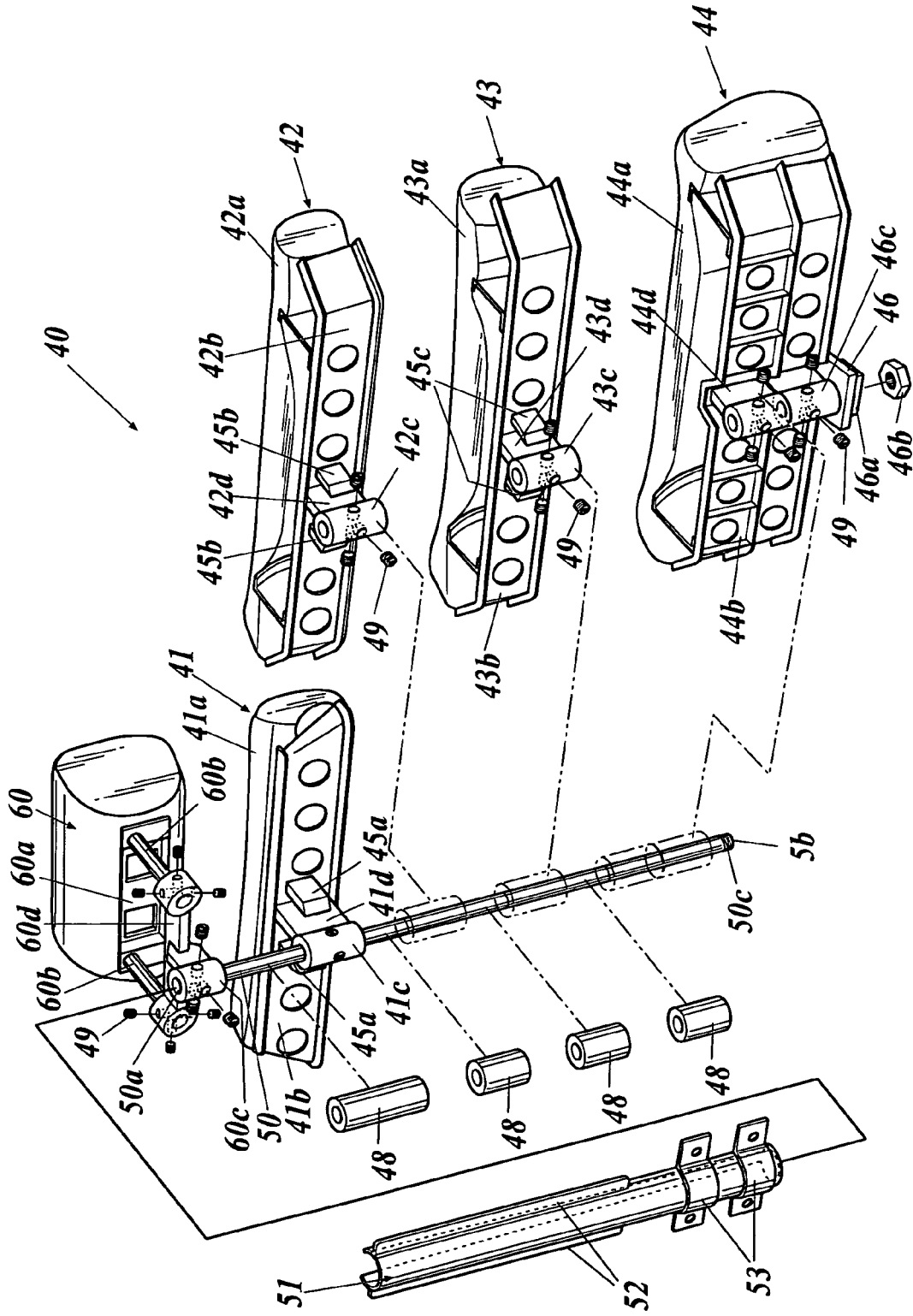
FIG. 6 is an exploded perspective view illustrating how seat back pieces are attached to an attachment member.

When the plurality of seat back pieces 41, 42, 43, and 44 are attached to the attachment member 50 as shown in FIG. 6, the upper end section 50a of the attachment member 50 is previously attached with the headrest 60 and then the attachment member 50 at the lower part of the headrest 60 is attached with the first seat back piece 41 to the fourth seat back piece 44 in this order. Specifically, the plurality of seat back pieces 41, 42, 43, and 44 are attached to the attachment member 50 by inserting the attachment member 50 to the respective seat shafts 41c, 42c, 43c, and 44c provided at the plurality of seat back pieces 41, 42, 43, and 44.

Then, pipe members 48 are provided among the plurality of seat back pieces 41, 42, 43, and 44. These pipe members 48 have the same diameter as those of the respective seat shafts 41c, 42c, 43c, and 44c and have a predetermined length. Thus, the respective seat back pieces 41, 42, 43, and 44 can be attached to the attachment member 50 with a predetermined space thereamong. This prevents the plurality of seat back pieces 41, 42, 43, and 44 from having a contact to one another to reduce friction resistance, thus allowing a driver to twist his or her body with a large angle toward the backside.

Then, the plurality of seat back pieces 41, 42, 43, and 44 and the headrest 60 are attached and fixed to the attachment member 50 by cut screws 49 in which the screw heads do not protrude from the surface of the fixed parts so that the sleeve member 51 can be externally inserted into the plurality of seat back pieces 41, 42, 43, and 44 in a smooth manner. The reason is that the attachment member 50 is attached with the center parts in the width direction of the plurality of seat back pieces 41, 42, 43, and 44 and then the sleeve member 51 is further externally inserted into the plurality of seat back pieces 41, 42, 43, and 44.

On the other hand, the sleeve member 51 is externally inserted into the attachment member 50 to cover the respective seat shafts 41c, 42c, 43c, and 44c and the pipe member 48 and then the fixation plate section 53 at the lower end section is fixed to the sleeve fixation member 47 via a bolt 54.

Figure 7A:
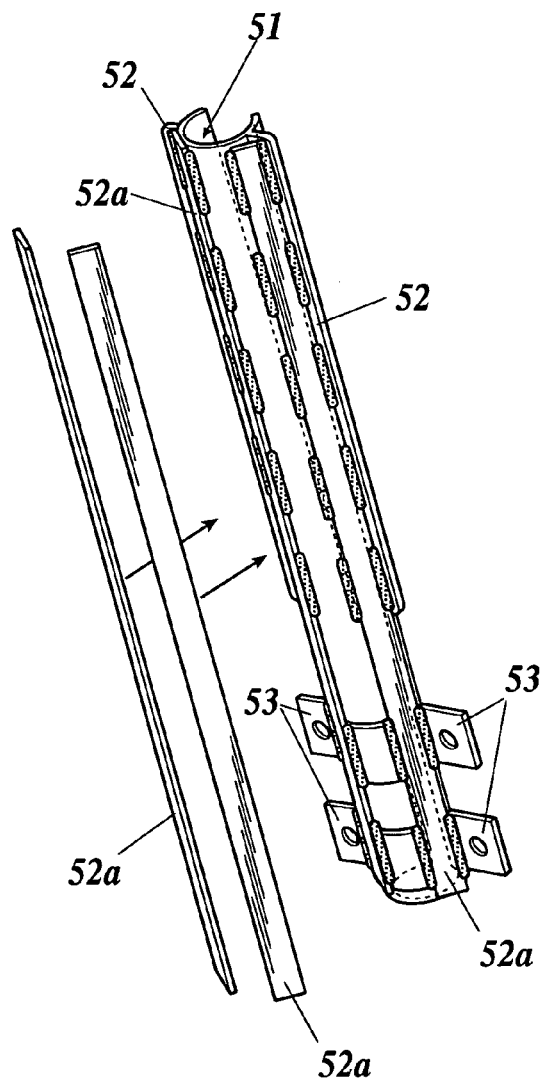
FIG. 7A is a perspective view illustrating an example of a reinforced backing plate.
Figure 7B:
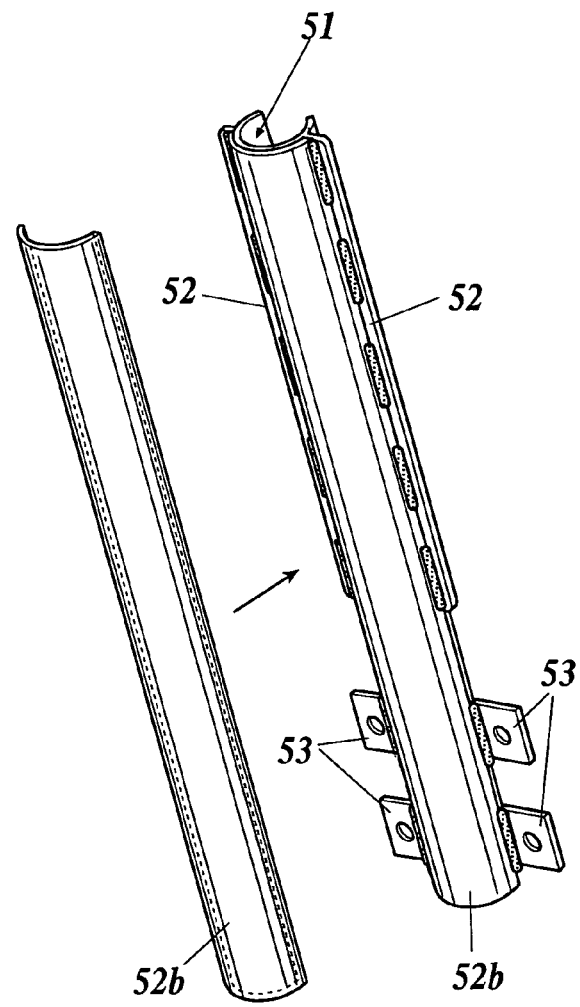
FIG. 7B is a perspective view illustrating another example of a reinforced backing plate.

As shown in FIGS. 7A and 7B, the backing plates 52 provided at the sleeve member 51 are preferably reinforced so that a driver can twist his or her body toward the backside while the body of the driver can be supported in a more stable manner.

In FIG. 7A, one of long reinforcing plate members 52a is welded to the backing plate 52 and the other is welded to the surface of the sleeve member 51. This can remarkably improve the strength of the backing plate 52.

In FIG. 7B, the backing plates 52 can have an improved strength without deteriorating its appearance by a reinforcing member 52b that extends form a backing plate 52 to the other backing plate 52 to cover the surface of the sleeve member 51.

Figure 8:
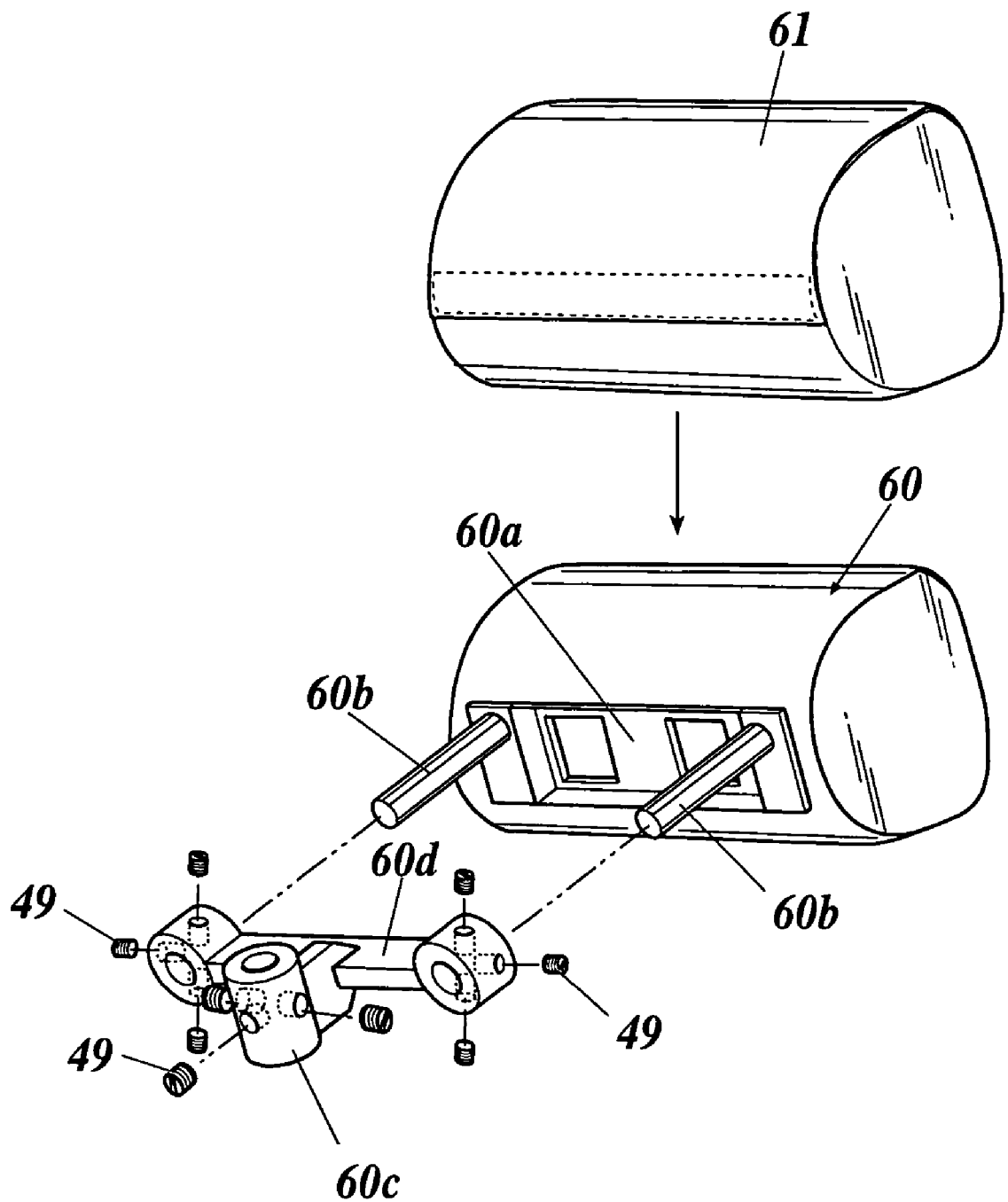
FIG. 8 is a perspective view illustrating a structure of a headrest.

Furthermore, the headrest 60 is preferably covered by a top cover 61 as shown in FIG. 8 so that the back face of the headrest 60 is prevented from being exposed. Although not shown, the plurality of seat back pieces 41, 42, 43, and 44 are also preferably covered by a top cover so as to have an improved appearance.

As described above, according to the vehicle seat 10 of this embodiment, the respective center parts in the width direction of the plurality of seat back pieces 41, 42, 43, and 44 are attached to the attachment member 50 and the plurality of seat back pieces 41, 42, 43, and 44 are set to have fixed twist angles. Thus, the plurality of seat back pieces 41, 42, 43, and 44 and the headrest 60 can be twisted around the axis in accordance with the twist of the body of a driver toward the backside, thus allowing the driver to easily twist his or her body toward the backside. Furthermore, when the driver twists his or her body toward the backside, the plurality of seat back pieces 41, 42, 43, and 44 are rotated in a manner adapted to the contour of the driver. This can provide a fit with the back surface of the driver and a reaction force by the twist of the attachment member 50 can provide the rotation restoration force of the plurality of seat back pieces 41, 42, 43, and 44. Thus, when the driver returns the backwardly-twisted body to the front side, the driver can return the body easily, providing a comfortable seat to sit in.

The entire disclosure of Japanese Patent Application No. Tokugan 2005-138395 filed on May 11, 2005 including specification, claims, drawings and summary are incorporated herein by reference in its entirety.

What is claimed is:

1. A vehicle seat comprising a base frame supported on a base, a seat cushion provided on the base frame, and a seat back, wherein:
   the seat back is structured so that a plurality of seat back pieces are arranged in the up-and-down direction with a predetermined space;
   the base frame or a lowermost seat back piece is attached with an attachment member that stands so as to be elastically deformed and be able to be twisted around an axis, and the plurality of seat back pieces are attached to the attachment member, respectively; and
   a sleeve member is externally inserted into the attachment member and a lower end section of the sleeve member is fixed to the base frame or the lowermost seat back piece.

2. The vehicle seat as claimed in claim 1, wherein the attachment member is a torsion bar.

3. The vehicle seat as claimed in claim 1, wherein center parts in the width direction of the plurality of seat back pieces are attached to the attachment member, respectively.

4. The, vehicle seat as claimed in claim 1, wherein:
   the seat back pieces are linked to the attachment member by linking members; and
   the sleeve member includes opening sections to which the linking members are inserted and which restrict twist of the seat back piece by an abutment of end sections of the opening sections with the linking members when the seat back piece and the attachment member are twisted around an axis by a predetermined amount.

5. The vehicle seat as claimed in claim 1, wherein:
   the sleeve member is attached with a pair of long backing plates in an axial direction of the sleeve member so that the backing plates protrude to an outer side in a diameter direction of the sleeve member; and
   a back face of the seat back piece is attached with restriction members that restrict twist of the seat back piece by abutting with the backing plate when the seat back piece and the attachment member are twisted around an axis with a predetermined amount, and the restriction members are arranged to have a predetermined space to the backing plate.

6. The vehicle seat as claimed in claim 5, wherein a distance between the backing plate and the restriction members increases toward a top seat back piece.

7. The vehicle seat as claimed in claim 1, wherein an upper end section of the attachment member is attached with a headrest.

* * * * *